United States Patent [19]

Chong, Jr.

[11] Patent Number: 5,896,492

[45] Date of Patent: Apr. 20, 1999

[54] MAINTAINING DATA COHERENCY BETWEEN A PRIMARY MEMORY CONTROLLER AND A BACKUP MEMORY CONTROLLER

[75] Inventor: Fay Chong, Jr., Cupertino, Calif.

[73] Assignee: Sun Microsystems, Inc., Palo Alto, Calif.

[21] Appl. No.: 08/742,603

[22] Filed: Oct. 28, 1996

[51] Int. Cl.[6] .................................................. G06F 11/20
[52] U.S. Cl. ............................ 395/182.01; 395/182.03; 711/162
[58] Field of Search .................... 395/182.01, 182.03, 395/183.05, 183.06; 711/141, 162; 371/22.1, 22.32

[56] References Cited

U.S. PATENT DOCUMENTS

| | | | |
|---|---|---|---|
| 5,574,730 | 11/1996 | End, II et al. | 371/22.1 |
| 5,617,425 | 4/1997 | Anderson | 395/182.03 |
| 5,712,970 | 1/1998 | Arnott et al. | 395/182.03 |

*Primary Examiner*—Robert W. Beausoliel, Jr.
*Assistant Examiner*—Pierre E. Elisca

*Attorney, Agent, or Firm*—Kang S. Lim; James D. Ivey; Stuart P. Kaler

[57] ABSTRACT

A fault tolerant memory control system is provided for a computer system having a host processor, a memory and a system interconnect. The memory control system includes a primary memory controller and a backup memory controller with a tap coupled to the interconnect. Data is transferred from the host processor to the memory in the form of data packets. First, the host processor writes to the memory by sending a data packet to the primary memory controller which then caches the data from the data packet. The backup memory controller taps the interconnect to obtain a backup copy of the data packet as the data packet is being sent from the host processor to the primary memory controller which caches the data from the backup copy of the data packet. If the primary memory controller is functional, the primary memory controller sends the data to the memory via a primary path coupling the primary memory controller to the memory. Conversely, if the primary memory controller fails, i.e., is non-functional, the backup memory controller is tasked with completing the data transfer via a backup path coupling the backup memory controller to the memory.

16 Claims, 9 Drawing Sheets

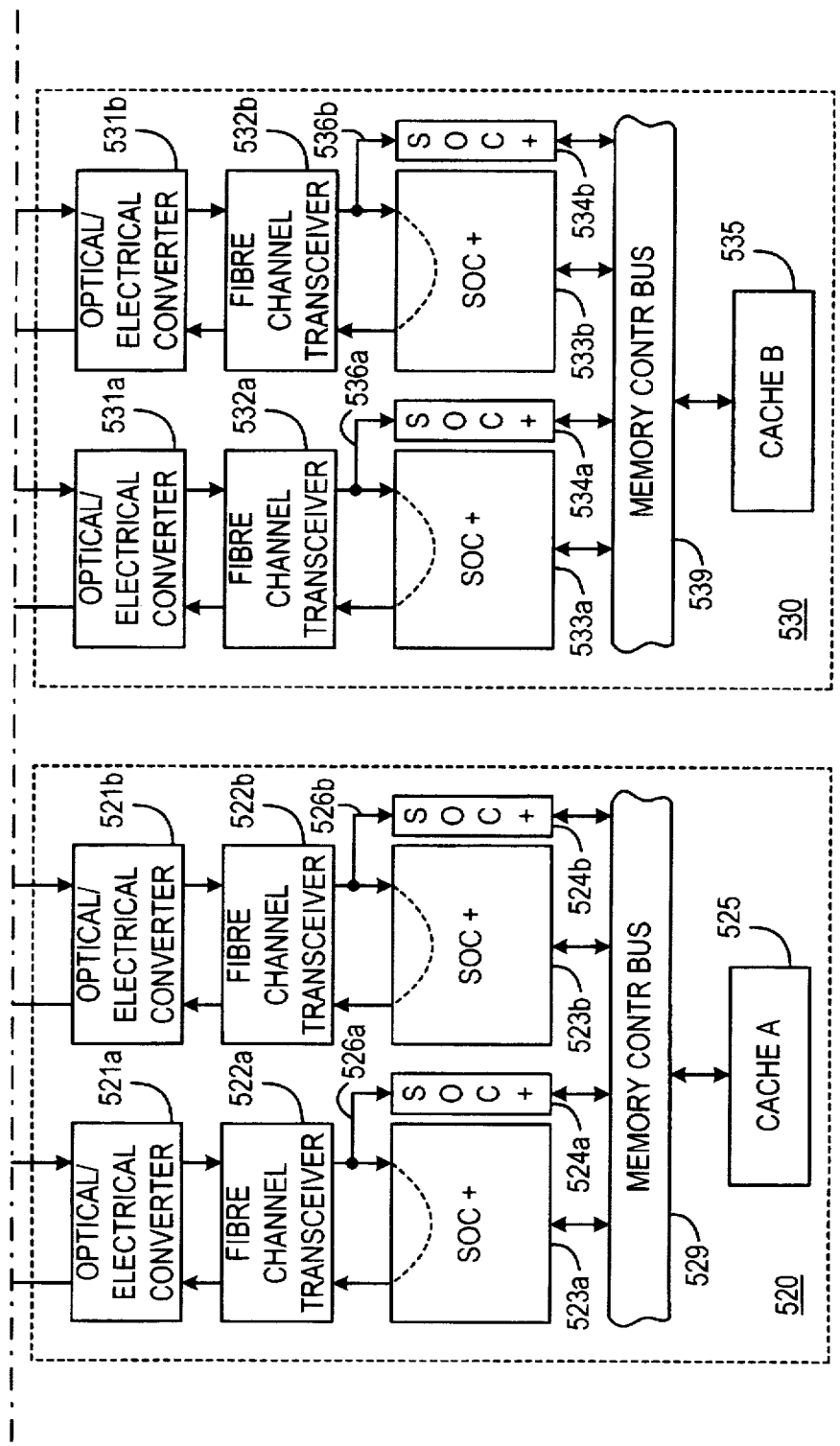

MAINTAINING DATA COHERENCY BETWEEN A PRIMARY MEMORY CONTROLLER AND A BACKUP MEMORY CONTROLLER

BACKGROUND OF THE INVENTION

1. Field of the Invention

This invention relates to the field of fault tolerance. More particularly, the present invention relates to maintaining data coherence in a fault tolerant computer system.

2. Description of the Related Art

In a computer system for a realtime application such as an on-demand video server, rapid recovery from a failure of an individual component of the computer system is highly desirable in order to be able to maximize the mean time between failure (MTBF) of the computer system. One method employed to increase system MTBF is the inclusion of redundant critical components such as memory controllers.

FIG. 1A is a block diagram of a computer system including a host processor 110, a primary memory controller 120, a backup memory controller 130 and a memory 140. Memory controllers 120, 130 include caches 125, 135, respectively. Host processor 110 is coupled to controller 120, 130 via a system bus 190.

When data is transferred from host processor 110 to memory 140, duplicate copies of the data are maintained in caches 125, 135, so that should primary memory controller 120 fail during a data transfer, backup memory controller 130 can complete any outstanding data transfer to memory 140. Subsequently, backup memory controller 130 takes over control of memory 140 until the failed primary memory controller 120 is replaced. Duplication of the data in caches 125, 135 can be accomplished using several approaches.

In one approach as illustrated by FIG. 1A, a data packet is sent by processor 110 to primary memory controller 120 for eventual transfer to memory 140, followed by a duplicate data packet from processor 110 to backup memory controller 130. Disadvantages of this approach include extra processing time and extra system bus utilization incurred by host processor 110 to send the two consecutive data packets to controller 120, 130.

FIG. 1B illustrates a second approach for maintaining duplicate data in caches 125, 135, involving adding a dedicated data link 196 between caches 125, 135. In this approach, host processor 110 is responsible for sending a single copy of the data packet to primary memory controller 120. In turn, primary memory controller 120 is tasked ensuring that a copy of the data packet is transferred from cache 125 to cache 135 of backup memory controller 130, before an acknowledgment is sent to host processor 110 indicating that data in caches 125 and 135 are now coherent. However, one drawback of this approach is the extra cost of data link 196. Further, the time delay for first sending the data packet and then executing a cache to cache transfer is not an improvement over the first approach where consecutive duplicate data packets are transferred from host processor 110 to controller 120, 130.

FIG. 1C illustrates a third and more expensive approach which involves adding hardware to host controller 110 and dedicated connections 192, 194 between host processor 110 and controllers 120, 130, respectively, enabling host processor 110 to concurrently send duplicate data packets to both controllers 120, 130. In this example, since dedicated data paths 192, 194 provide independent connections between host processor 110 and controller 120, 130, respectively, concurrent data packet transfers from processor 110 can be executed without incurring any time delay. The tradeoff in this approach is the extra hardware cost associated with duplicate data paths 192, 194.

Hence, there is a need for an effective method of providing fault-tolerant memory control system which does not unnecessarily burden the host processor nor the memory controller(s), and at minimal additional hardware cost.

SUMMARY OF THE INVENTION

The present invention provides a fault tolerant memory control system for a computer system having a host processor, a memory and a system interconnect. The memory control system includes a primary memory controller and a backup memory controller with a tap coupled to the interconnect.

Data is transferred from the host processor to the memory in the form of data packets. First, the host processor writes to the memory by sending a data packet to the primary memory controller which then caches the data from the data packet. In accordance with the invention, the backup memory controller taps the interconnect to obtain a backup copy of the data packet as the data packet is being sent from the host processor to the primary memory controller which caches the data from the backup copy of the data packet.

If the primary memory controller is functional, the primary memory controller sends the data to the memory via a primary path coupling the primary memory controller to the memory. Conversely, if the primary memory controller fails, i.e., is non-functional, the backup memory controller is tasked with completing the data transfer via a backup path coupling the backup memory controller to the memory.

In another embodiment, the computer system includes a first memory and a second memory, and the fault tolerant memory control system includes a first memory controller, a second memory controller, with the memory controllers providing backup to each other in the event of a failure of one of the memory controllers.

Accordingly, under normal operation, i.e., when both memory controllers are functional, the host processor sends data to the first memory and the second memory via the first memory controller and the second memory controller, respectively. In the event of the failure of one of the memory controllers, e.g., the second memory controller, the first memory controller having tapped into the interconnect for data packet(s) destined for the second memory controller, is now able to complete any outstanding and/or subsequent data transfers to the second memory.

Advantages of the present invention include reduced load on the system interconnect, reduced latency in backing up data, and reduced latency in recovering from partial system failures. In addition, the change in software and hardware needed to implement such a solution is minimal since most of the backup functionality is provided by existing hardware.

DESCRIPTION OF THE DRAWINGS

The objects, features and advantages of the system of the present invention will be apparent from the following description in which.

DESCRIPTION OF THE PREFERRED EMBODIMENT

In the following description, numerous details provide a thorough understanding of the invention. These details include functional blocks and an exemplary memory control architecture to aid implementation of a fault tolerant scheme for maintaining data coherency among duplicated subsystems within a computer system. In addition, while the present invention is described with reference to a specific designation scheme involving memory controllers for a computer system, the invention is applicable to a wide range of subsystems and computer architectures. In other instances, well-known circuits and structures are not described in detail so as not to obscure the invention unnecessarily.

Figure 1A:
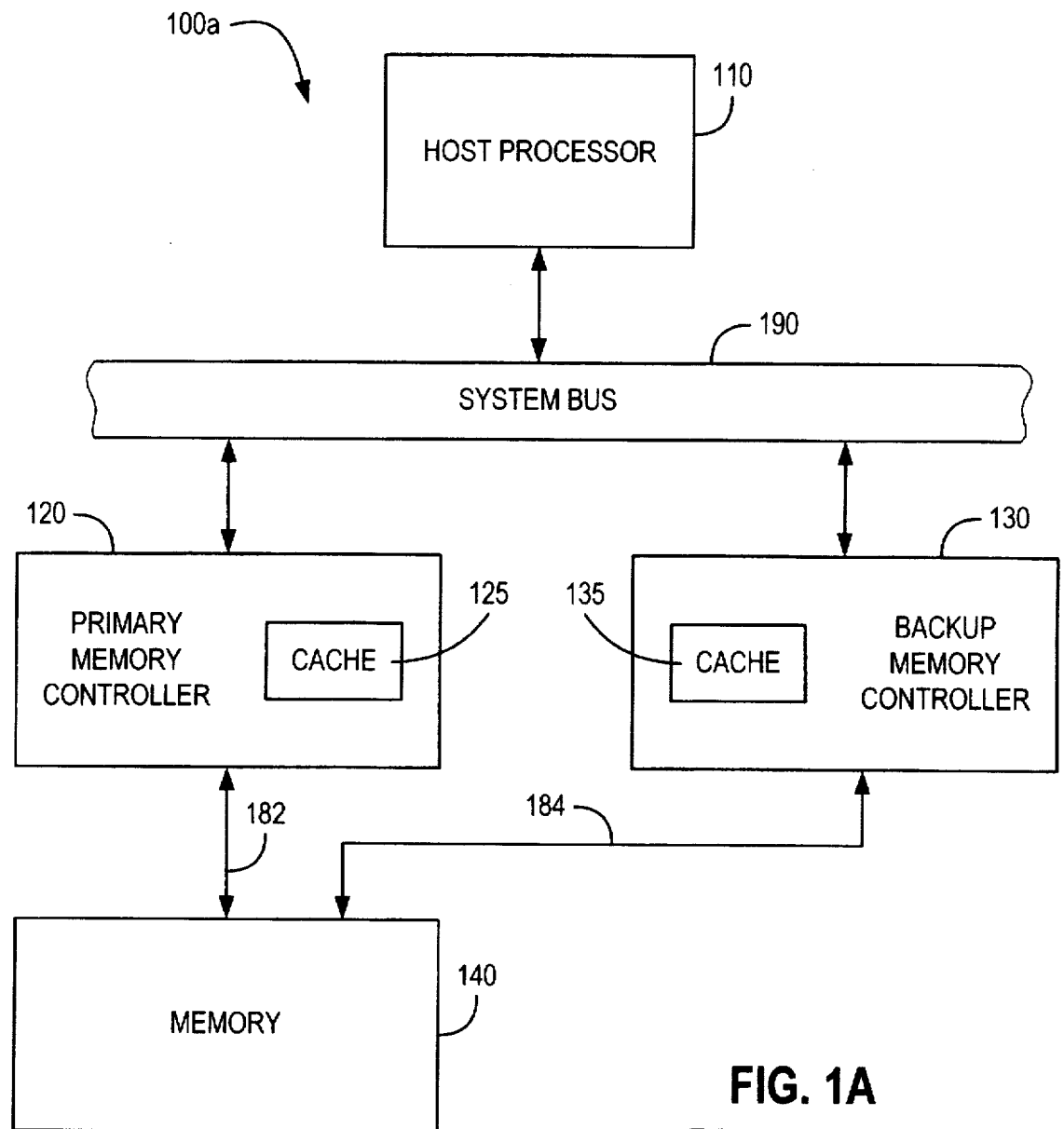
FIGS. 1A, 1B and 1C illustrate three conventions fault tolerant memory control systems.
Figure 1B:
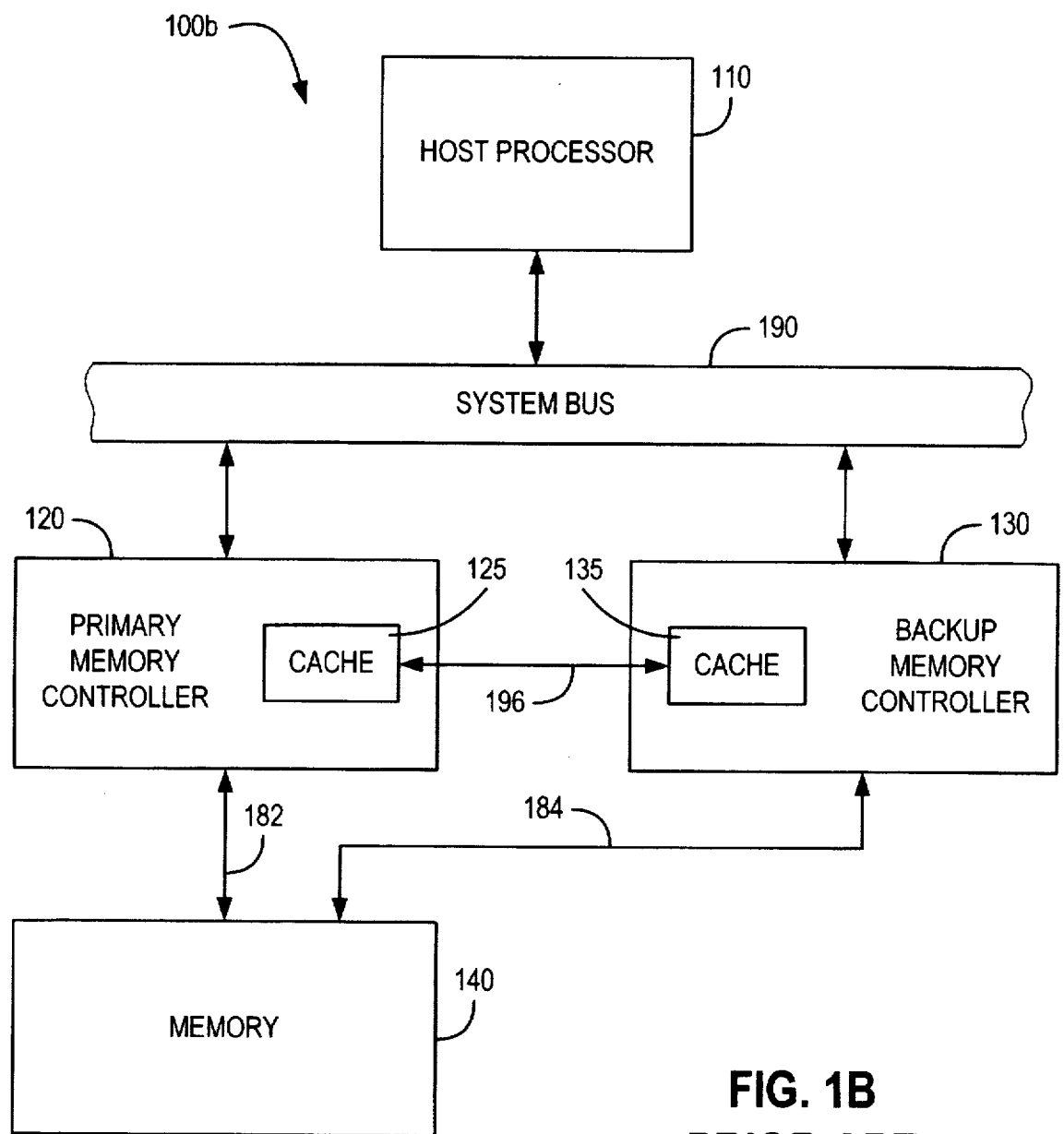
Figure 1C:
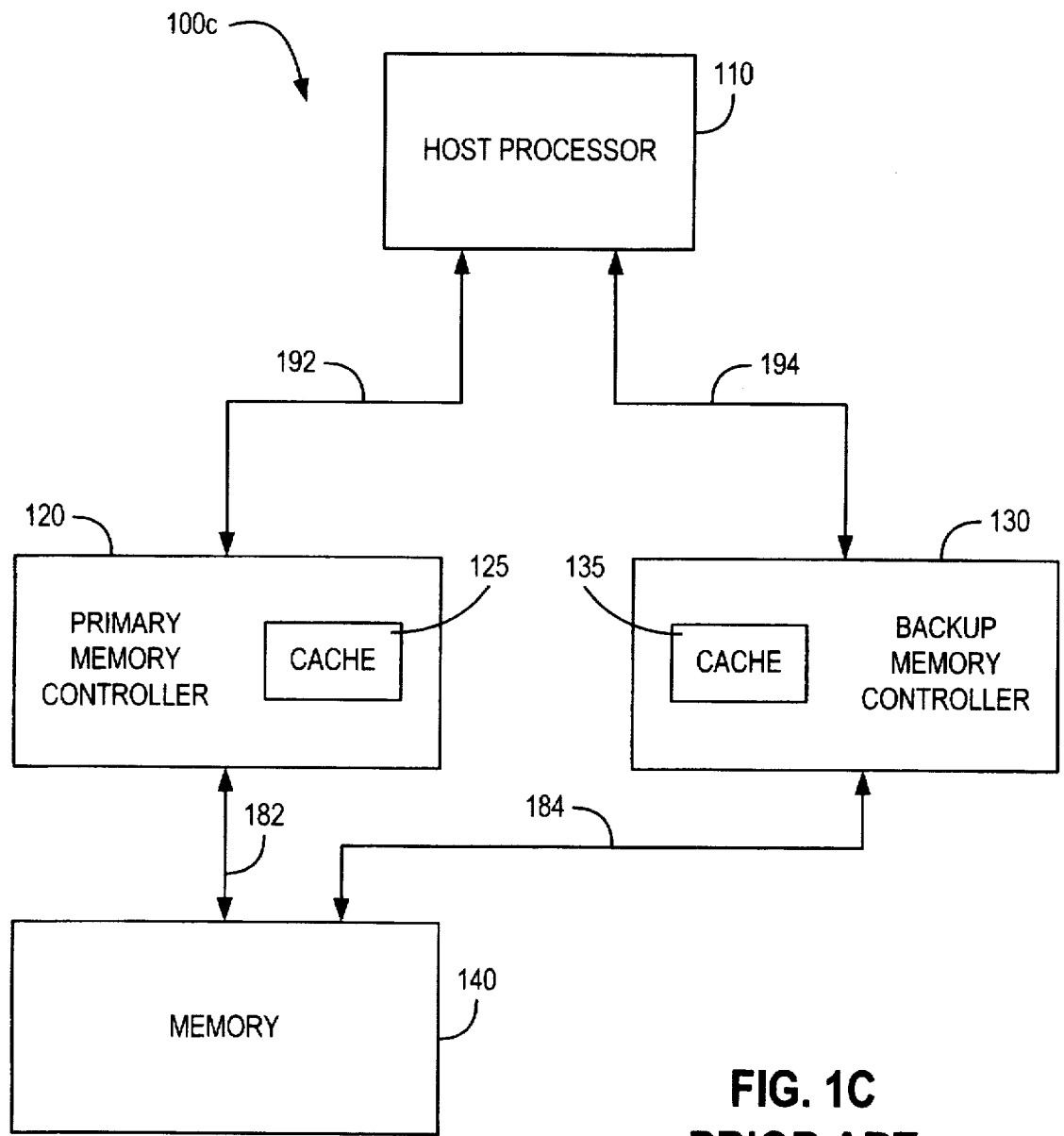
Figure 2:
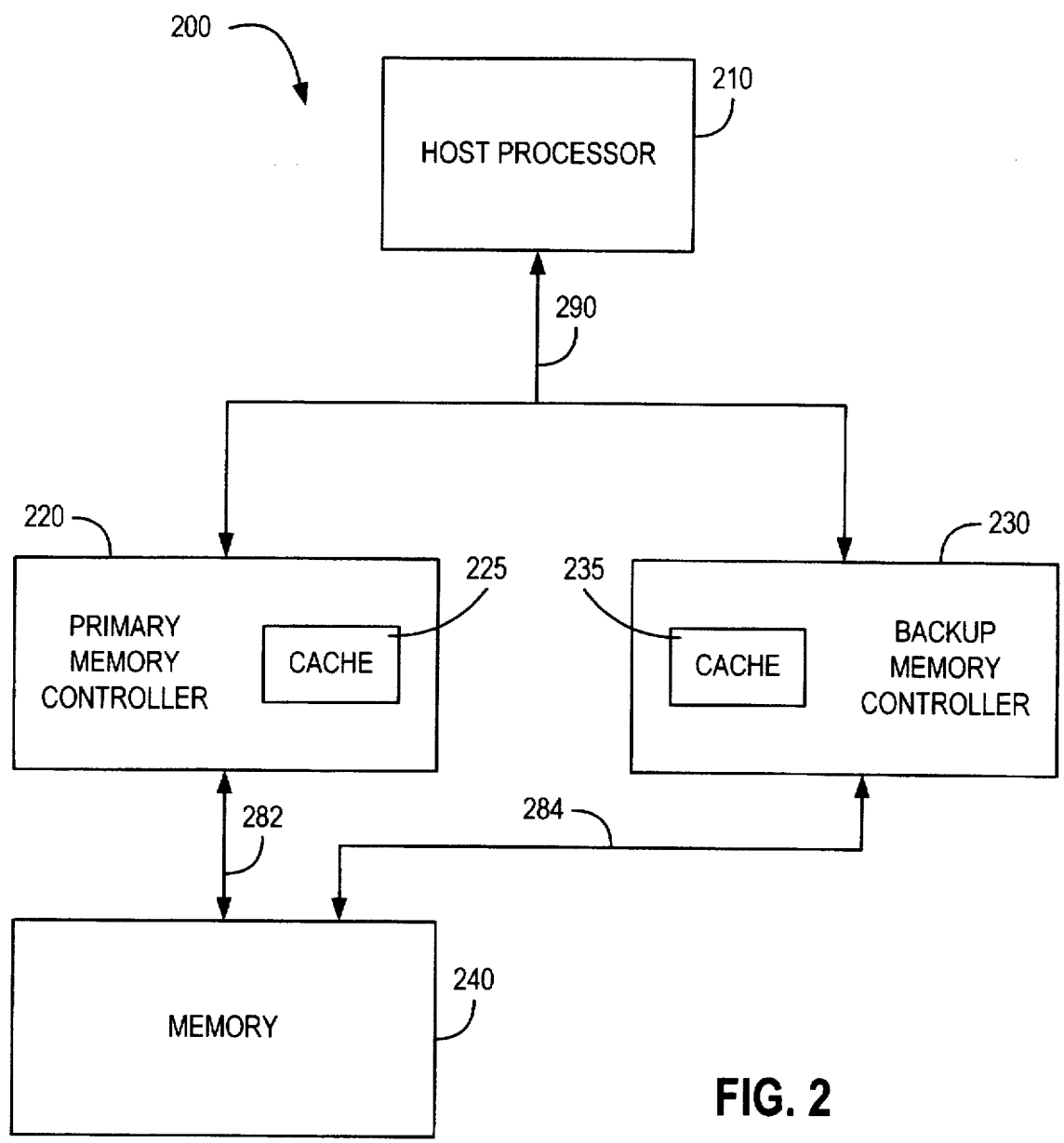
FIGS. 2 and 3 are a block diagram and a flowchart illustrating a fault tolerant memory control system of the present invention with dual memory controllers.
Figure 3:
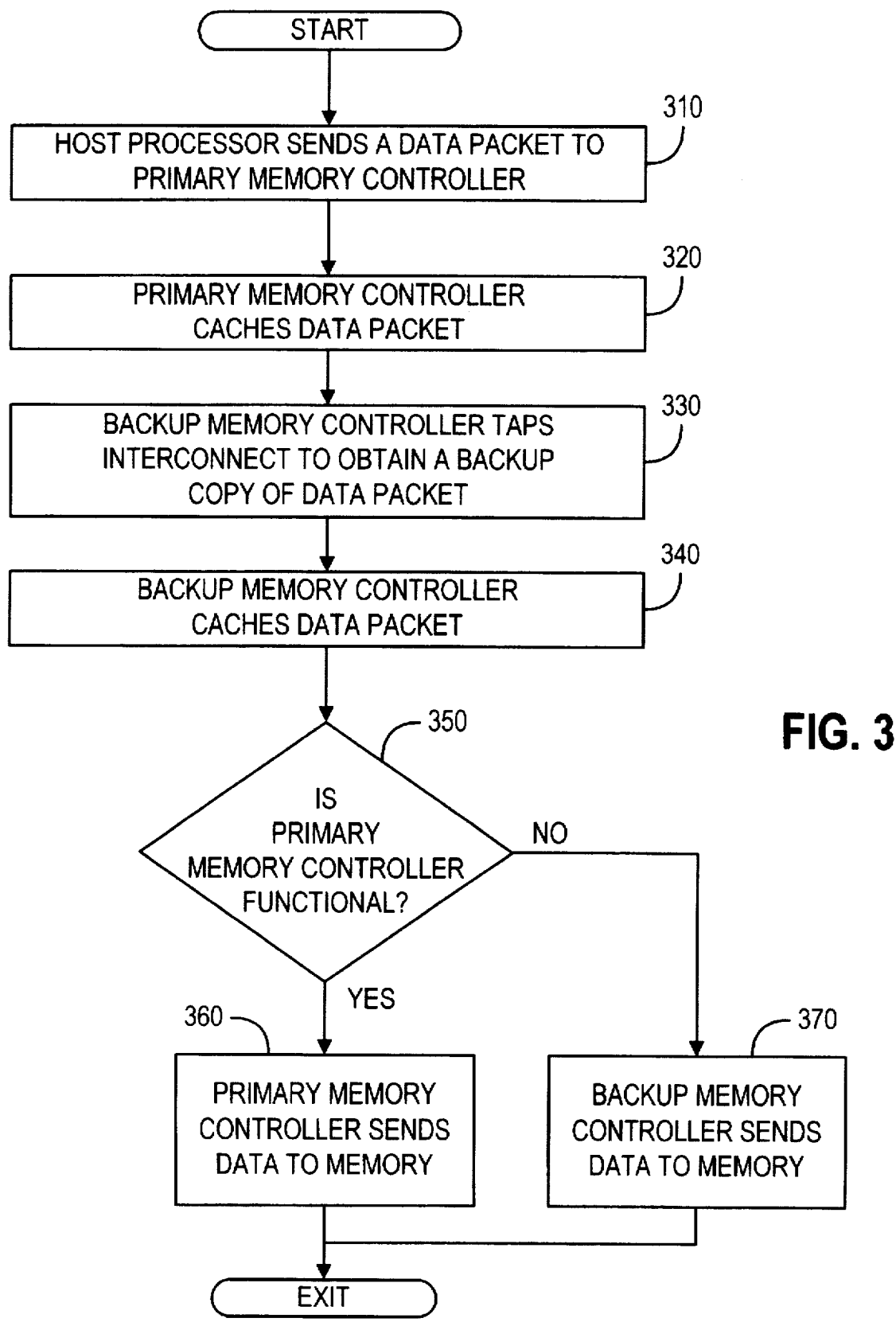

FIGS. 2 and 3 are a block diagram and a flowchart, respectively, illustrating one embodiment of the fault-tolerant memory control architecture of the present invention. Computer system 200 includes a host processor 210, a primary memory controller 220, a backup memory controller 230, a memory 240 and an interconnect 290. Examples of memory 240 include random access memories (RAMs), magnetic disk drives, optical disk drives and magnetic tape drives.

When host processor 210 needs to send data to memory 240, processor first sends a data packet to primary memory controller 220 (step 310). Next, primary memory controller 220 stores the data in cache 225 (step 320). If functional, primary memory controller 220 should now be able to transfer the data from the data packet to memory 240 (steps 350, 360).

In accordance with the invention, backup memory controller 230 taps interconnect 290 to obtain a backup copy of the data packet as the data packet is being sent from processor 210 to primary memory controller 220 (step 330). Tapping can be accomplished in a number of ways. For example, backup memory controller 230 may "listen" on interconnect 290 and extract all data packets whose destination address matches that of primary memory controller 220.

Backup memory controller 230 stores the backup copy of the data packet in cache 225 (step 340). By maintaining data coherency between primary memory controller 220 and backup memory controller 230 in their respective caches 225, 235, when primary memory controller 220 is faulty, i.e., not functional, and is unable to complete a data transfer associated with the data packet, backup memory controller 230 is now able to complete the data transfer to memory 240 without host processor 210 (steps 350, 370).

Figure 4:
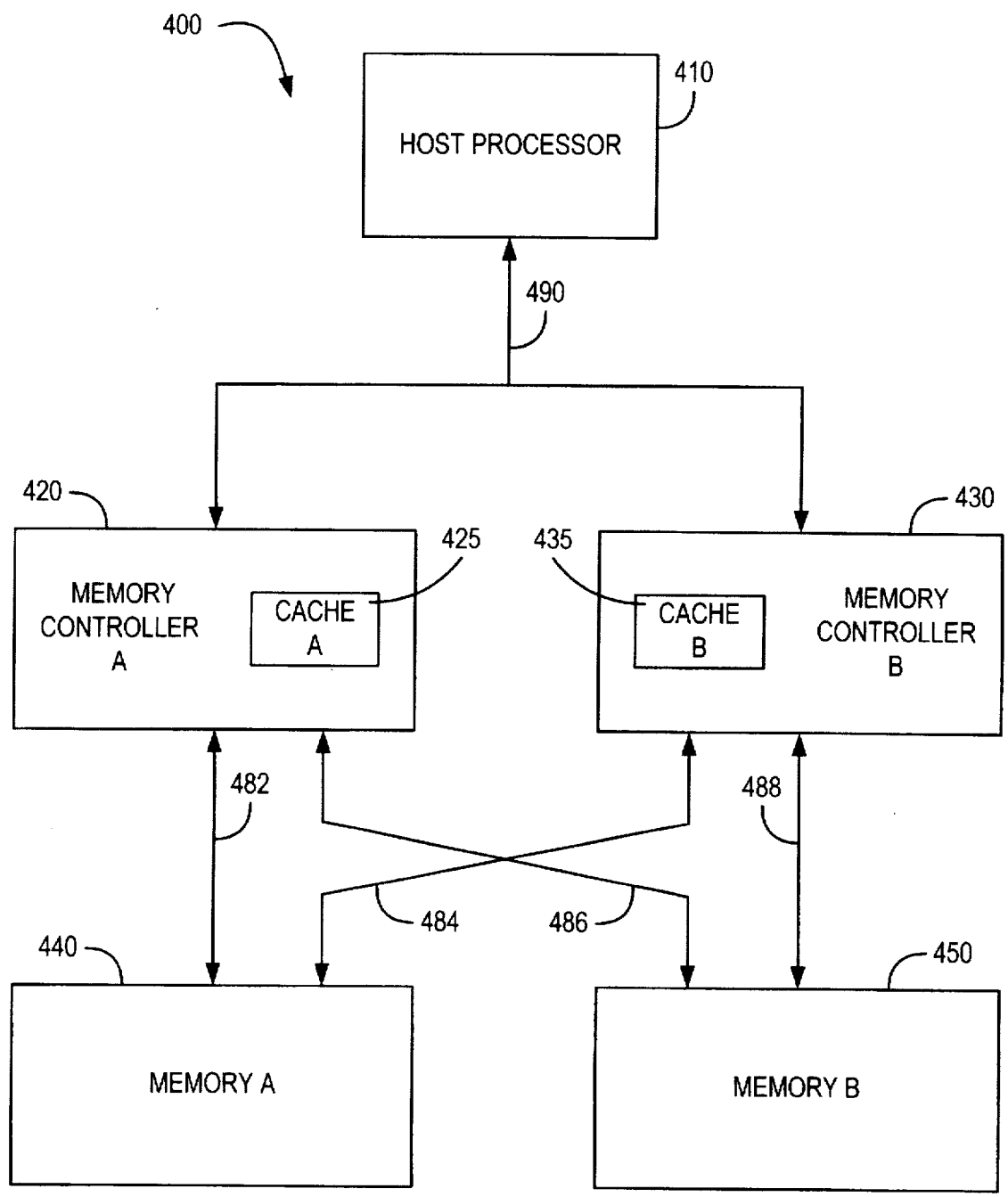
FIG. 4 illustrates another embodiment of the invention with dual memories and dual memory controllers.

FIG. 4 is a block diagram showing a more efficient embodiment of the present invention wherein fault tolerance is provided by existing hardware. Computer system 400 includes a host processor 410, a memory controller A 420, a memory controller B 430, a memory A 440, a memory B 450 and a system interconnect 490. Memory controllers 420, 430 are coupled to memories 440, 450 by primary paths 482, 488 and secondary paths 484, 486. In this embodiment, memory controllers 420, 430 also function as backup memory controllers for each other, thereby providing fault tolerance without the need for additional memory controller(s).

For example, when processor 410 needs to send data to memory A 440, processor 410 sends a data packet to memory controller A 420. As a backup to memory controller A 420, memory controller B 430 taps interconnect 490 to obtain a duplicate copy of the data packet. Subsequently, both controllers 420, 430, store the data from their respective copies of the data packet in their respective caches 425, 435. If controller A 420 is functional, controller A 420 then transfers the data to memory A 440 via primary path 482. Alternatively, if controller A 420 is not functional, then "backup" memory controller B 430 is responsible for transferring the data to memory A 440 via secondary path 484.

Conversely, when processor 410 needs to send data to memory B 450, processor 410 sends a data packet to memory controller B 430. As a backup to memory controller B 430, memory controller A 420 taps interconnect 490 to obtain a duplicate copy of the data packet. Subsequently, both controllers 420, 430, store the data from their respective copies of the data packet in their respective caches 425, 435. If controller B 430 is functional, controller B 430 then transfers the data to memory B 450 via primary path 488. Alternatively, if controller B 430 is not functional, then "backup" memory controller A 420 is responsible for transferring the data to memory B 450 via secondary path 486.

Figure 5A:
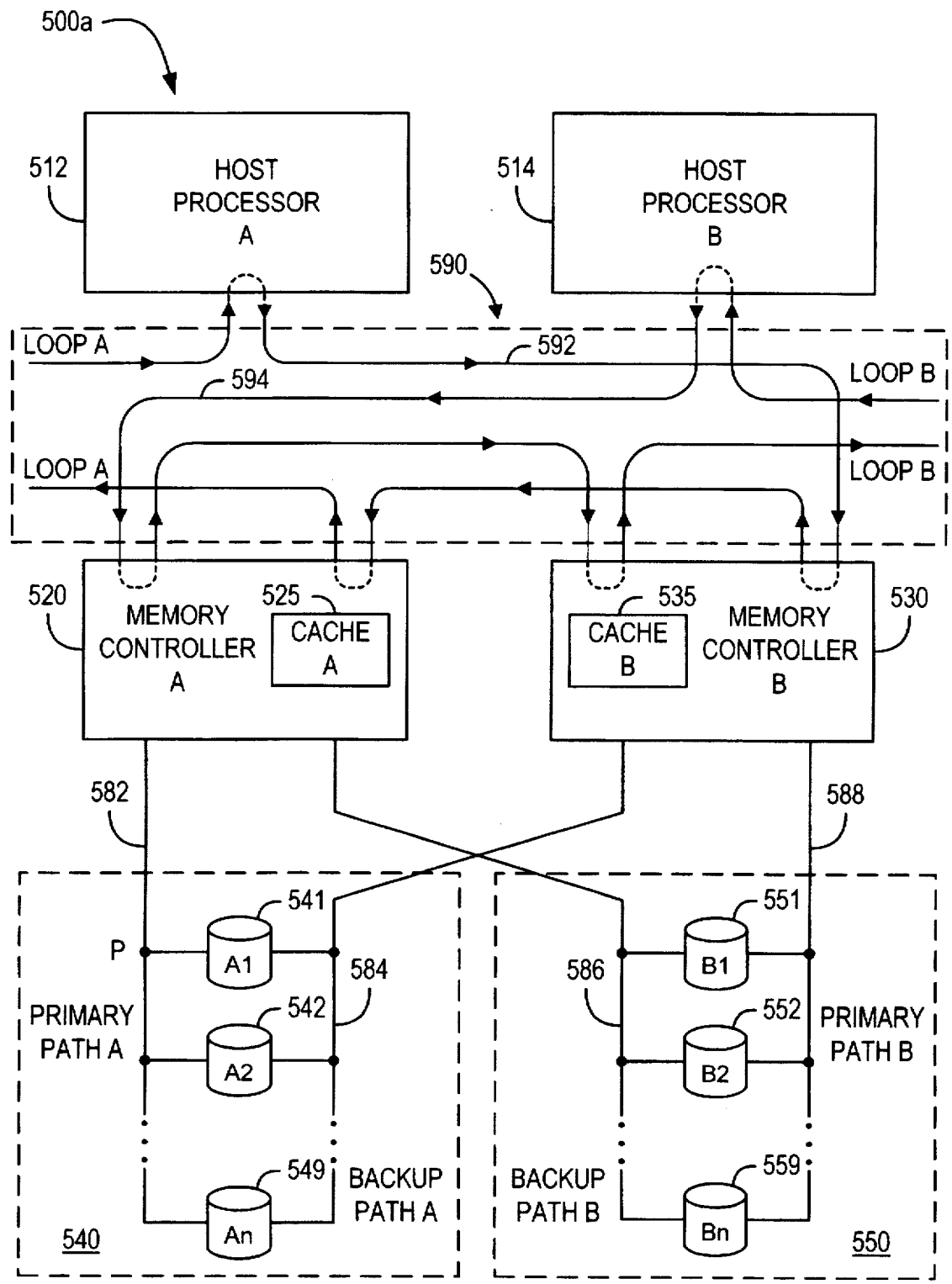
FIG. 5A illustrates yet another embodiment of the invention with dual processors, dual memories and dual memory controllers.

In yet another embodiment as shown in FIG. 5A, computer system 500a includes a host processor A 512, a host processor B 514, a memory controller A 520, a memory controller B 530, a memory A 540, a memory B 550 and a system interconnect 590.

Memories 540 and 550 can be anyone of a variety of memories, including but not limited to RAMs and magnetic/optical disk arrays. In addition, this invention may be practiced in combination with other fault tolerant and data compression/decompression techniques such as RAID and MPEG.

In this implementation, memories 540 and 550 are RAID magnetic disk arrays of drives 541, 542 . . . 549, and drives 551, 552, . . . 559, respectively. System interconnect 590 includes loop A 592 and loop B 594, which are FibreChannel arbitrated loops, currently defined by the American National Standard for Information Technology (ANSI) working draft proposal X3.272-199x.

Loop A 592 connects host processor A 512 to memory controller A 520 and memory controller B 530. Similarly, loop B 594 connects host processor B 514 to memory controller A 520 and memory controller B 530. Memory controllers 520, 530 are coupled to memories 540,550 by primary paths 582, 588 and secondary paths 584, 586. In this embodiment, memory controllers 520, 530 also function as backup memory controllers for each other, thereby providing fault tolerance without the need for additional memory controller(s).

For example, when host processor A 512 needs to send data to memory A 540, processor A 512 sends a data packet to memory controller A 520 via loop A 592. As a backup to memory controller A 520, memory controller B 530 taps loop A 592 to obtain a duplicate copy of the data packet.

Figure 5B:
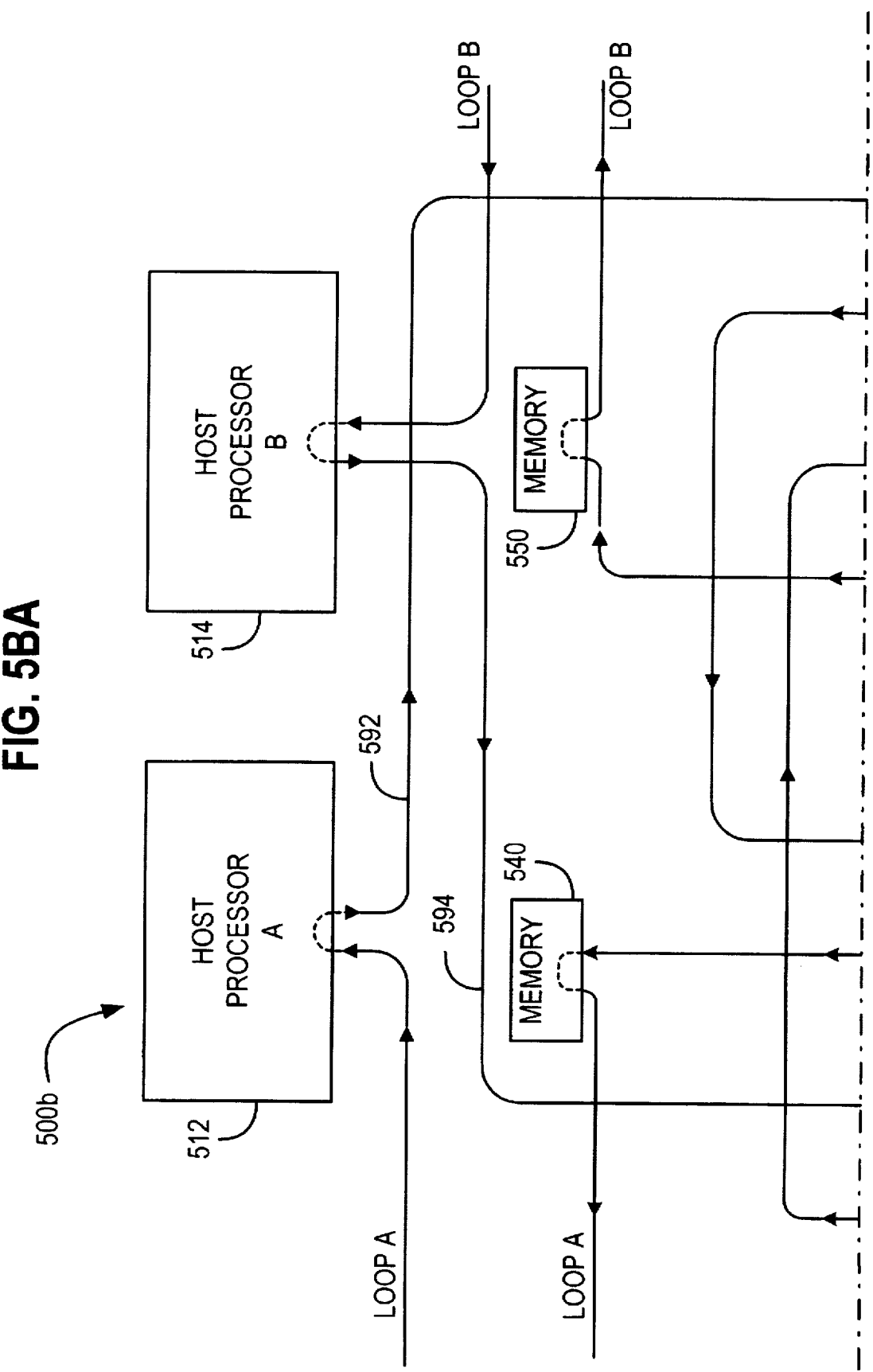
FIG. 5B is a block diagram showing one implementation of the embodiment of FIG. 5B having a pair FibreChannel loops with taps.

FIG. 5B shows the embodiment of FIG. 5A with exemplary pairs of taps 536b, 526b and 526a, 536a into FibreChannel loops 592, 594, respectively. System 500b includes host processors 512,514 and memory controllers 520,530. Memory controller A 520 includes optical/electrical converters 521a, 521b (VIXEL p/n 0027605), FibreChannel transceivers 522a, 522b (HP p/n HDMP-1526), primary Serial Optical Channel (SOC+) controllers 523a, 523b (LSI Logic p/n 100 4262-01), tapping SOC+controllers 524a, 524b, a memory controller bus 529 and cache 525. Similarly, memory controller B 530 includes optical/electrical converters 531a, 531b, serial/parallel converters 532a, 532b, primary Serial Optical Channel (SOC+) controllers 533a, 533b, tapping SOC+controllers 534a, 534b, a memory controller bus 539 and cache 535.

Memory controller A 520 also includes taps 526a, 526b coupling input nodes of primary SOC+s 523a, 523b to input nodes of tapping SOC+s 524a, 524b, respectively. Similarly, memory controller B 530 also includes taps 536a, 536b coupling input nodes of primary SOC+s 533a, 533b to input nodes of tapping SOC+s 534a, 534b, respectively. Hence, taps 526a, 526b and taps 536a, 536b enable controllers 520, 530 to copy via tapping SOC+s 524a, 524b and tapping SOC+s 534a, 534b, respectively, data packets destined for each other (see also step 330 of FIG. 3).

Subsequently, both memory controllers 520, 530, store the data from their respective copies of the data packet in their respective caches 525, 535. Accordingly, when controller A 520 is functional, controller A 520 transfers the data to memory A 540 via primary path 582. Alternatively, when controller A 520 is not functional, "backup" memory controller B 530 is responsible for transferring the data to memory A 540 via secondary path 584.

Conversely, when host processor B 514 needs to send data to memory B 550, processor 514 sends a data packet to memory controller B 530 via loop B 594. As a backup to memory controller B 530, memory controller A 520 taps loop B 584 to obtain a duplicate copy of the data packet. Subsequently, both memory controllers 520, 530 store the data from their respective copies of the data packet in their respective caches 525, 535. Accordingly, when controller B 530 is functional, controller B 530 then transfers the data to memory B 550 via primary path 588. Alternatively, if controller B 530 is not functional, then "backup" memory controller A 520 is responsible for completing the data transfer to memory B 550 via secondary path 586.

Hence, by adding tapping capability to both memory controllers 520,530, and backup paths 584,586, computer system 500 is now fault tolerant without the need for adding redundant memory controllers and without slowing down memory access when both memory controllers 520,530 are functional. It is appreciated that the above described scheme for efficient retrieval of data is also applicable to the storage of data.

In this embodiment, loops 592,594 include both optical and electrical portions, and optical electrical converters 521a, 521b, 531a, 531b provide interfaces between the optical and electrical portions. In other embodiments, loops 592 and 594 can be entirely electrical, and converters 521, 531 are not required. Other modifications are possible. For example, additional memory controller(s) and memory(s) may be added, with the second memory controller backing up the first memory controller, the third memory controller backing up the second memory controller, . . . and with the last memory controller backing up the first memory controller.

Thus, the invention has been described with reference to specific embodiments, numerous additions and modifications are possible without departing from the spirit of the invention. For example, tapping may also be used by fault-tolerant computer systems which include a pair of mirrored processors which execute code and store data synchronously. Hence, the scope of the invention should be determined by the following claims.

What is claimed is:

1. In a fault tolerant computer system having a host processor, a primary memory controller, a backup memory controller, at least one memory and an interconnect, said host processor coupled to said primary controller and said backup controller via said interconnect, a method for maintaining data coherency between said primary memory controller and said backup memory controller comprising the steps of:

sending a data packet from said host processor to said primary memory controller via said interconnect;

caching said data packet at said primary memory controller;

tapping said interconnect to obtain a backup copy of said data packet for said backup memory controller as said data packet is being sent from said host processor to said primary memory controller via said interconnect; and caching said backup copy of said data packet at said backup memory controller.

2. The method of claim 1 wherein if said primary memory controller is unable to send said data packet to said at least one memory, then the method includes the step of sending said backup copy of said data packet from said backup memory controller to said at least one memory.

3. The method of claim 1 wherein the interconnect is a FibreChannel loop and said tapping step includes the step of copying said backup copy into a backup serial optical controller of said backup memory controller.

4. A fault tolerant memory control system for a computer system having a host processor, at least one memory and a system interconnect, said host processor coupled to the memory control system via said interconnect, the memory control system comprising:

a primary memory controller coupled to said host processor via said interconnect, the primary memory controller configured to receive a data packet from said host processor via said interconnect, and configured to store data from said data packet; and a backup memory controller coupled to said host processor via said interconnect;

a tap coupled between said interconnect and said backup memory controller, said tap configured to obtain a backup copy of said data packet for said backup memory controller as said data packet is being sent from said host processor to said primary memory controller via said interconnect, and wherein said backup memory controller is configured to store data from said backup copy of said data packet.

5. The memory control system of claim 4 further comprising:

a primary path coupled between said primary memory controller and said at least one memory, said primary path configured to transfer the data stored at said primary memory controller to said at least one memory when said primary memory controller is functional; and a backup path coupled between said backup memory controller and said at least one memory, said backup path configured to transfer the data stored at said backup memory controller to said at least one memory when said primary memory controller is non-functional.

6. The memory control system of claim 4 wherein said interconnect is a FibreChannel loop.

7. The memory control system of claim 5 wherein said interconnect and said primary path are extensions of a FibreChannel loop.

8. The memory control system of claim 7 wherein said tap is coupled to a backup serial optical controller of said backup memory controller.

9. A fault tolerant computer system comprising:

a first host processor;

a first interconnect coupled to said first host processor;

a first memory controller coupled to said first host processor via said first interconnect, the first memory controller configured to receive a first data packet from said first host processor via said first interconnect, and configured to store data from said first data packet;

a second memory controller coupled to said first host processor via said first interconnect;

a first tap coupled between said first interconnect and said second memory controller, said first tap configured to obtain a backup copy of said first data packet for said second memory controller as said first data packet is being sent from said first host processor to said first memory controller via said first interconnect, and wherein said second memory controller is configured to store data from said backup copy of said first data packet; and a first memory.

10. The computer system of claim 9 further comprising:

a first primary path coupled between the first memory controller and said first memory, the first primary path configured to transfer the data from said first data packet stored at said first memory controller to said first memory when said first memory controller is functional; and a first backup path coupled between the second memory controller and said first memory, the first backup path configured to transfer the data from said first data packet stored at said second memory controller to said first memory when said first memory controller is non-functional.

11. The computer system of claim 9 wherein said first interconnect is a first FibreChannel loop and said first tap is coupled to a backup serial optical controller (SOC) of said second memory controller.

12. The computer system of claim 9 wherein said first memory is an array of disk drives.

13. The computer system of claim 10 further comprising:

a second interconnect coupled to said first memory controller and said second memory controller;

a second host processor coupled to said second interconnect, and wherein the second memory controller is further configured to receive a second data packet from the second host processor via said second interconnect, and configured to store data from said second data packet;

a second memory;

a second primary path between the second memory controller and said second memory, said second primary path configured to transfer the data from said second data packet stored at said second memory controller to said second memory when said second memory controller is functional;

a second tap coupled between said second interconnect and said first memory controller, said second tap configured to obtain a backup copy of said second data packet for said first memory controller as said second data packet is being sent from said second host processor to said second memory controller via said second interconnect, and wherein the first memory controller is further configured to store data from said backup copy of said second data packet; and a second backup path between the first memory controller and the second memory, the second backup path configured to transfer the data stored at said first memory controller to said second memory when said second memory controller is non-functional.

14. The computer system of claim 13 wherein said first interconnect is a first FibreChannel loop and said first tap is coupled to a backup serial optical controller (SOC) of said second memory controller, and wherein said second interconnect is a second FibreChannel loop and said second tap is coupled to a backup SOC of said first memory controller.

15. The computer system of claim 13 wherein said first memory and said second memory are arrays of disk drives.

16. The computer system of claim 15 wherein said first interconnect and said first primary path are extensions of a first FibreChannel loop, and said second interconnect and said second primary path are extensions of a second FibreChannel loop.

* * * * *